United States Patent
Yu et al.

(10) Patent No.: US 11,485,819 B2
(45) Date of Patent: Nov. 1, 2022

(54) ELASTOMER MATERIAL MODIFIED BY A HYBRID HARD SEGMENT MATERIAL AND PREPARATION METHOD THEREOF

(71) Applicant: Zhejiang Yuanrong Technology Co., Ltd, Hangzhou (CN)

(72) Inventors: Songmao Yu, Hangzhou (CN); Lvming Xiao, Hangzhou (CN); Yangang Yu, Hangzhou (CN); Wanqin Zhang, Hangzhou (CN); Qiwei Zheng, Hangzhou (CN)

(73) Assignee: Zhejiang Yuanrong Technology Co., Ltd, Hangzhou (CN)

( * ) Notice: Subject to any disclaimer, the term of this patent is extended or adjusted under 35 U.S.C. 154(b) by 459 days.

(21) Appl. No.: 16/748,806

(22) Filed: Jan. 22, 2020

(65) Prior Publication Data
US 2020/0291171 A1    Sep. 17, 2020

(30) Foreign Application Priority Data
Mar. 11, 2019    (CN) .......................... 201910182121.5

(51) Int. Cl.
*C08G 18/83* (2006.01)
*C08G 18/10* (2006.01)
(Continued)

(52) U.S. Cl.
CPC ........... *C08G 18/838* (2013.01); *C08G 18/10* (2013.01); *C08G 18/4063* (2013.01);
(Continued)

(58) Field of Classification Search
CPC .......................... C08G 18/838; C08G 18/837
See application file for complete search history.

(56) References Cited

U.S. PATENT DOCUMENTS

| 4,607,090 A * | 8/1986 | Dominguez | C08G 18/5024 264/DIG. 83 |
|---|---|---|---|
| 2003/0162874 A1* | 8/2003 | Redford | C09D 7/00 524/262 |
| 2008/0255312 A1* | 10/2008 | Mielke | C08F 8/40 525/418 |
| 2012/0010314 A1* | 1/2012 | Charpentier | C09D 7/62 521/157 |
| 2013/0079485 A1* | 3/2013 | Cai | C08G 18/7621 528/68 |

(Continued)

FOREIGN PATENT DOCUMENTS

CN    108117631 A  *  6/2018  ............. C08G 18/10

OTHER PUBLICATIONS

Google Translation of CN 108117631 (Year: 2022).*

*Primary Examiner* — Michael M Dollinger
(74) *Attorney, Agent, or Firm* — Bayramoglu Law Offices LLC

(57) ABSTRACT

An elastomer material includes at least two components; the first component includes isocyanate prepolymer obtained through reaction of polyol and isocyanate, and its —NCO content is 22-30%; the second component includes 50-70 parts of polyether amine, 2-10 parts of liquid amine chain extender, 5-15 parts of hydroxyl-terminated polybutadiene, and 1-15 parts of hybrid hard segment material; the hybrid hard segment material includes one or more of nano titanium dioxide, nano aluminum oxide and nano silica. Through adjusting the —NCO content of the isocyanate prepolymer, increasing the hard segment content, and combining with the components in the second component, the invention ensures the elasticity of the polymer while improving its mechanical properties, and also improves the electrical insulation and wear resistance of the material.

16 Claims, 1 Drawing Sheet

(51) Int. Cl.
    *C08G 18/76*   (2006.01)
    *C08G 18/71*   (2006.01)
    *C08G 18/48*   (2006.01)
    *C08G 18/50*   (2006.01)
    *C08G 18/40*   (2006.01)
    *C08G 18/62*   (2006.01)
    *C08G 18/72*   (2006.01)

(52) U.S. Cl.
    CPC ..... *C08G 18/4812* (2013.01); *C08G 18/4825* (2013.01); *C08G 18/4829* (2013.01); *C08G 18/5024* (2013.01); *C08G 18/6204* (2013.01); *C08G 18/71* (2013.01); *C08G 18/724* (2013.01); *C08G 18/7614* (2013.01); *C08G 18/7657* (2013.01)

(56) References Cited

U.S. PATENT DOCUMENTS

| | | | |
|---|---|---|---|
| 2013/0331484 A1* | 12/2013 | Braum | C08G 18/718 156/62.4 |
| 2014/0316073 A1* | 10/2014 | Locke | C08G 18/4202 568/69 |
| 2015/0265743 A1* | 9/2015 | Hanson | A61L 15/32 424/617 |
| 2017/0183534 A1* | 6/2017 | Lezzi | C08G 18/6685 |
| 2019/0322789 A1* | 10/2019 | Lubitz | C08G 18/12 |
| 2020/0239730 A1* | 7/2020 | Martin | B05D 1/02 |
| 2020/0291171 A1* | 9/2020 | Yu | C08G 18/724 |
| 2020/0291229 A1* | 9/2020 | Yu | C08G 18/4825 |
| 2020/0361136 A1* | 11/2020 | Fenn | B29C 64/336 |

* cited by examiner

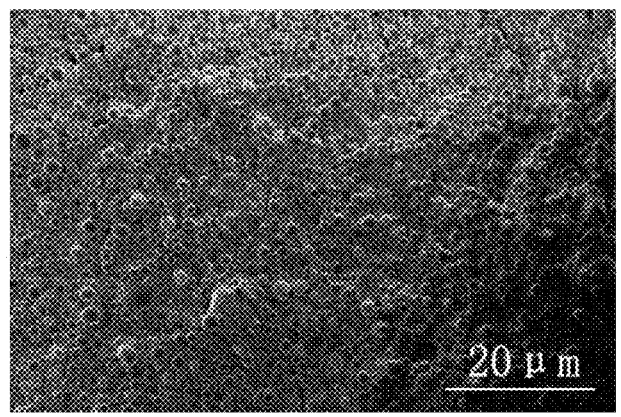

ELASTOMER MATERIAL MODIFIED BY A HYBRID HARD SEGMENT MATERIAL AND PREPARATION METHOD THEREOF

CROSS REFERENCE TO THE RELATED APPLICATIONS

This application is based upon and claims priority to Chinese Patent Application No. 2019101821215, filed on Mar. 11, 2019, the entire contents of which are incorporated herein by reference.

TECHNICAL FIELD

The invention relates to the technical field of polyurea materials, in particular to an elastomer material modified by a hybrid hard segment material and its preparation method.

BACKGROUND

Isocyanate and polyamine can be polymerized to form polyurea. Due to the high reactivity of the active hydrogen component, the polyreaction of the two components does not require a catalyst, and their reaction is direct and fast with mild reaction conditions and high efficiency. Moreover, the obtained polyurea material has high impact and wear resistance, and good anti-seepage effect, corrosion resistance and comprehensive mechanical properties. It has been widely used in national defense, civil engineering and water conservancy and hydropower projects.

Elastomer materials have been widely used in more and more fields. For example, in most electrical applications, elastomer materials are required to provide better insulation properties.

In view of this, this invention is specifically proposed.

SUMMARY

A first object of the invention is to provide an elastomer material modified by a hybrid hard segment material. The elastomer material introduces a nano-inorganic material in a certain manner, which can effectively improve the electrical insulation and wear resistance of the elastomer material.

A second object of the invention is to provide a method for preparing the elastomer material modified by a hybrid hard segment material. The operation of the preparation method is simple, the preparation conditions are mild, and the prepared elastomer material has good structural stability and excellent performance.

In order to achieve the above objects of the invention, the following technical solution is adopted:

An elastomer material modified by a hybrid hard segment material comprises at least two components;

The first component comprises isocyanate prepolymer obtained through reaction of polyol and isocyanate, and the isocyanate prepolymer has a —NCO content of 22-30%; the second component comprises the following components in parts by weight: 50-70 parts of polyether amine, 2-10 parts of liquid amine chain extender, 5-15 parts of hydroxyl-terminated polybutadiene, and 1-15 parts of hybrid hard segment material; the hybrid hard segment material includes one or more of nano titanium dioxide, nano aluminum oxide and nano silica.

The invention adjusts the —NCO content of isocyanate prepolymer to increase the hard segment content, thus reducing the soft segment content, increasing the content of urea bonds in the elastomer and the rigid chain segments, and improving the hardness, tear strength, tensile strength and other mechanical properties. Meanwhile, polyether amine and hydroxyl-terminated polybutadiene in the second component ensure the elasticity of the polymer while improving the mechanical properties.

Hybrid hard segment material is added to the second component, and grafted into the elastomer material through coupling and other reactions, which greatly improves the electrical insulation and wear resistance of the material. For example, nano silica, which has saturated residual bonds and hydroxyl groups with different bonding states on the surface, can be effectively grafted into the elastomer material to improve the cross-linking performance between polymer chains, thus ensuring the mechanical strength of the material, and providing excellent electrical insulation and wear resistance for the material. In addition, nanomaterials have a tendency to agglomerate. Mixing nanomaterials with hydroxyl-terminated polybutadiene can improve the interaction between nanomaterials and hydroxyl-terminated polybutadiene, reduce the cohesion tendency of nanomaterials, and improve the dispersion uniformity of nanomaterials in the elastomer material, so that the performance of the elastomer material is stably improved.

Preferably, the functionality ratio between the two components is 1: (1-1.05), that is, the functionality ratio of isocyanate prepolymer to the other component is (1-1.05).

Preferably, the hybrid hard segment material comprises one or more of surface-pretreated nano titanium dioxide, nano aluminum oxide and nano silica. More preferably, surface pretreatment comprises: a surface graft coupling agent of nano titanium dioxide and/or nano aluminum oxide and/or nano silica. Titanate coupling agent, silane coupling agent or other coupling agents may be used. As the coupling conditions of silane coupling agent are mild, silane coupling agent is preferable.

By performing surface pretreatment for the hybrid hard segment material and grafting a coupling agent on the surface of the hybrid hard segment material, the compatibility between the hybrid hard segment material and the organic polymer is improved, and the hybrid hard segment material is uniformly dispersed in the polymer material.

The particle size of the hybrid hard segment material obtained through the coupling treatment in the invention is preferably 50-80 nm, more preferably 50-70 nm, and further preferably 50-60 nm.

When the size of the hybrid hard segment material is within the above range, the graf compatibility of the hybrid hard segment material in the elastomer material can be sufficiently improved, and the overall performance of the elastomer material can be improved. If the particle size is too small and the agglomeration force is too large, most of the nanomaterial in the obtained elastomer material cannot be effectively grafted, resulting in material sedimentation and dispersion, and reduced mechanical properties; if the particle size is too large, the coating process of the elastomer material will be affected, and the obtained elastomer material is insufficient in strength.

Preferably, the hydroxyl-terminated polybutadiene used in the invention has a number average molecular weight of 1,000 to 2,000, more preferably 1,500.

Preferably, the hydroxyl-terminated polybutadiene has an iodine value of ≤40 Ig/100 g, more preferably, ≤30 Ig/100 g.

By using hydroxyl-terminated polybutadiene with a relatively low iodine value, the content of double bonds in the molecular chain is reduced, and the oxidation resistance of the material is guaranteed.

Preferably, the hydroxyl-terminated polybutadiene has a hydroxyl value of 50-80 KOHmg/g, more preferably, 60-75 KOHmg/g.

By optimizing and controlling the hydroxyl value within the above range, the hydroxyl-terminated polybutadiene and other components are appropriately crosslinked, and the hybrid hard segment material can be uniformly dispersed and grafted in the elastomer material.

Preferably, isocyanates include diisocyanate and/or triisocyanate. More preferably, isocyanates further include monoisocyanate. Further preferably, diisocyanate includes any one of p-phenylene diisocyanate, 4,4'-diphenylmethane diisocyanate, and toluene diisocyanate. Preferably, any one of p-phenylene diisocyanate and 4,4'-diphenylmethane diisocyanate, and more preferably, p-phenylene diisocyanate.

P-phenylene diisocyanate and 4,4'-diphenylmethane diisocyanate have a high symmetry and high degree of regularity. As a hard segment in the polymer, they are more likely to aggregate, and the hard segment has an increased molecular mass and increased crystallinity, thus improving the mechanical properties of the elastomer, such as tensile strength and tear strength.

Preferably, isocyanates comprise monoisocyanate, diisocyanate and triisocyanate with a molar ratio of (0.1-0.3):(6-10):(1-2). More preferably, isocyanates comprise monoisocyanate, diisocyanate and triisocyanate with a molar ratio of 0.2:(8-9):1.

Isocyanates include the above three types, which are blended in a certain ratio to make the molecular weight of the prepared prepolymer moderate and avoid the excessive molecular weight, which results in difficult mixing and spraying. Trifunctional reactants give the polymer a certain crosslinking density, bifunctional reactants provide a certain degree of crystallinity, and monofunctional reactants modulate the molecular weight, thus taking into account mechanical strength, hardness and elasticity, and avoiding elastic loss due to an excessively large cross-linking density, and improper mechanical strength due to an excessively small cross-linking density.

Preferably, the polyol comprises glycol and/or triol. More preferably, the polyol comprises glycol and triol with a molar ratio of (4-6):1.

Through the ratio of glycol to triol, the structure of the polymer is adjusted, and the crosslinking density and crystallinity are also considered, so that the polymer has good comprehensive properties.

Preferably, the polyol includes any one of polyester polyol and polyether polyol. More preferably, the polyol is polyether polyol.

Preferably, the polyether amine comprises any one or more of polyether triamine and polyether diamine. More preferably, the polyether amine comprises polyether triamine and polyether diamine with a mass ratio of 1:(2-4). The polyether amine has a number average molecular weight of 400 to 5,000, preferably from 1,000 to 4,000, more preferably from 1,500 to 2,500.

The polyether amine acts as a reactive soft segment and reacts with the isocyanate prepolymer to form urea-containing polymer. By adjusting the molecular weight of the polyether amine, both the elasticity and strength of the polyurea are taken into consideration.

Preferably, the polyether amine comprises terminal amino polyoxypropylene ether and/or terminal amino polyoxyethylene ether.

Preferably, the liquid amine chain extender comprises one or more of diethyl methane diamine, dimethyl toluene diamine and dialkethylene diamine.

The invention adopts a chain extender with small molecular weight to diffuse and elongate molecular chains and improve the mechanical properties of the polymer. The conventional chain extender has a large molecular weight, and the obtained polymer has a small molecular weight. In combination with other components, a chain extender with small molecular weight is used to increase the molecular weight.

The invention also provides a preparation method of elastomer material, comprising the following steps:

Heat and dehydrate the polyol, react with isocyanates at 50-90° C. for 2-3 h, and defoam to obtain the first component;

Mix hydroxyl-terminated polybutadiene and the hybrid hard segment material uniformly, add polyether amine and liquid amine chain extender, mix them and heat to 50-90° C., and stir for 20-50 min to obtain the second component.

Preferably, mix hydroxyl-terminated polybutadiene and the hybrid hard segment material and stir uniformly at the rotational speed of 600-800 rpm. More preferably, the stirring time is 10-20 min.

Preferably, mix the two components with the supergravity mixing method, and spray to obtain the elastomer material.

The monomer of the components has a nanometer-sized uniformity during the reaction, so that the material has a micron-level closed-cell structure microscopically, and an isotropic honeycomb structure is obtained. It is an elastomer material, and the collapse is caused by the elastic buckling of the pore walls, so it can restore, thereby increasing the strength of the elastomer material.

Preferably, heat the two components to 55-70° C., adjust the pressure to 30-40 MPa, mix with the supergravity mixing method, and spray to obtain the elastomer material.

By adjusting the temperature and pressure within the above range, the two components can be thoroughly mixed with the super-gravity mixing technique, and elastomer with a moderate pore size and good distribution uniformity of pores can be obtained, which contributes to further improvement of the strength of the elastomer.

Compared with the prior art, the beneficial effects of the invention are as follows:

(1) The invention adjusts the —NCO content of isocyanate prepolymer to increase the hard segment content, thus increasing the rigid chain segments in the elastomer, and improving the hardness, tear strength, tensile strength and other mechanical properties. Meanwhile, polyether amine and hydroxyl-terminated polybutadienein the second component ensure the elasticity of the polymer while improving the mechanical properties;

(2) Hybrid hard segment material is added to the components, and grafted into the elastomer material through coupling and other reactions, which greatly improves the electrical insulation and wear resistance of the material.

BRIEF DESCRIPTION OF THE DRAWINGS

In order to more clearly describe the specific embodiments of the invention or the technical solutions in the prior art, the drawings used in the specific embodiments or the description of the prior art will be briefly introduced below. Obviously, the drawings as described below are some embodiments of the invention. For those of ordinary skill in the art, other drawings can be obtained based on these drawings without creative efforts.

FIGURE is the micro-morphology of the elastomer material according to an embodiment of the invention.

DETAILED DESCRIPTION OF THE EMBODIMENTS

The technical solutions of the invention will be clearly and completely described below in combination with the drawings and specific embodiments, but those skilled in the art will understand that the embodiments described below are a part of the embodiments of the invention, and not exhaustive. Such embodiments are intended to illustrate the invention and not to limit the scope of the invention. All other embodiments obtained by those skilled in the art based on the embodiments of the invention without creative efforts fall within the scope of protection of the invention. Conditions not specifically specified in the embodiments are conventional conditions or the conditions recommended by the manufacturers. Reagents or instruments used whose manufacturers are not indicated are commercially available conventional products.

The information about some reagents used in the embodiments of the invention is as follows (unless otherwise specified):

Polyether triol, manufacturer: Bayer, model: ARCOL-5613;

Polyether glycol, manufacturer: Bayer, model: ARCOL-1011;

Polyether triamine, manufacturer: Hubei Qifei Pharmaceutical Chemical Co., Ltd., model: H362005;

Polyether diamine, manufacturer: Huntsman, model: T-3000;

Hydroxyl-terminated polybutadiene, manufacturer: Nippon Soda Co., Ltd., model:

Embodiment 1

The elastomer material of this embodiment comprises two components.

The first component comprises isocyanate prepolymer obtained through reaction of polyether polyol with methyl isocyanate, p-phenylene diisocyanate and triphenylmethane isocyanate, and the isocyanate prepolymer has a —NCO content of 25%;

The second component comprises the following components in parts by weight: 15 parts of polyether triamine, 45 parts of polyether diamine, 6 parts of diethyl methane diamine, 10 parts of hydroxyl-terminated polybutadiene, and 10 parts of surface-pretreated nano titanium dioxide.

The preparation method of the elastomer material comprises the following steps:

(1) Mix 30 g of polyether triol and 100 g of polyether diol uniformly, heat to 100-120° C. for dehydration for 2-3 h, then cool to 70° C., add 1 g of methyl isocyanate, 135 g of p-phenylene diisocyanate, 35 g of triphenylmethane isocyanate, react for 2-3 h under heat insulation conditions, and defoam and cool to obtain the first component with a —NCO content of 25±1%;

(2) Add 10 parts of hydroxyl-terminated polybutadiene and 10 parts of surface-pretreated nano titanium dioxide into the stirring vessel, stir uniformly at the stirring speed of 600-800 rpm/min, then add 15 parts of polyether triamine, 45 parts of polyether diamine, 6 parts of diethyl methane diamine, heat to 70° C., and stir uniformly for 30 min at the stirring speed of 400-500 rpm/min to obtain the second component;

The preparation method of the surface-pretreated nano titanium dioxide comprises: soaking titanium dioxide with a particle size of 50 nm in 3M HCl for 24 h, and suction filtering and washing until the pH is 7.0. After drying, weigh the titanium dioxide particles and add them to the KH570 methanol solution (the mass of KH570 is 3% of that of the titanium dioxide particles), stir and react at 40° C. for 24 hours, filter, wash and dry them to obtain surface pre-treated nano titanium dioxide;

(3) Weigh the two components at the reactive functionality ratio of 1:1.02 (the first component to the second component), mix the two components with a supergravity reactor, heat to 62° C., adjust the pressure to 36 MPa, keep the flow rate of 0.183 L/min, and spray onto the surface of the substrate to obtain the elastomer material.

The micro-morphology of the elastomer material prepared in this embodiment is shown in the figure. It can be seen from the figure that the elastomer material obtained in this embodiment has a micron-level closed-cell structure microscopically and an isotropic honeycomb structure.

Embodiment 2

This embodiment refers to the elastomer material and its preparation method of Embodiment 1, except that the —NCO content of the first component—isocyanate prepolymer is 22%;

The preparation method of the first component comprises: mixing 30 g of polyether triol and 100 g of polyether diol uniformly, heating to 100-120° C. for dehydration for 2-3 h, then cooling to 70° C., adding 0.8 g of methyl isocyanate, 110 g of p-phenylene diisocyanate, and 30 g of triphenylmethane isocyanate, reacting for 2-3 h under heat insulation conditions, and defoaming and cooling to obtain the first component with a —NCO content of 22±1%.

Embodiment 3

This embodiment refers to the elastomer material and its preparation method of Embodiment 1, except that the —NCO content of the first component—isocyanate prepolymer is 30%;

The preparation method of the first component comprises: mixing 30 g of polyether triol and 100 g of polyether diol uniformly, heating to 100-120° C. for dehydration for 2-3 h, then cooling to 70° C., adding 1.5 g of methyl isocyanate, 220 g of p-phenylene diisocyanate, and 55 g of triphenylmethane isocyanate, reacting for 2-3 h under heat insulation conditions, and defoaming and cooling to obtain the first component with a —NCO content of 30±1%.

Embodiment 4

This embodiment refers to the elastomer material and its preparation method of Embodiment 1, except that the first component comprises isocyanate prepolymer obtained through reaction of polyether polyol with p-phenylene diisocyanate, and the isocyanate prepolymer has a —NCO content of 25%;

The preparation method of the first component comprises:

Mixing 30 g of polyether triol and 100 g of polyether diol uniformly, heating to 100-120° C. for dehydration for 2-3 h, then cooling to 70° C., adding 150 g of p-phenylene diisocyanate, reacting for 2-3 h under heat insulation conditions, and defoaming and cooling to obtain the first component with a —NCO content of 25±1%.

Embodiment 5

This embodiment refers to the elastomer material and its preparation method of Embodiment 1, except that the first component comprises isocyanate prepolymer obtained through reaction of polyether polyol with methyl isocyanate, p-phenylene diisocyanate and triphenylmethane isocyanate, and the isocyanate prepolymer has a —NCO content of 25%;

The preparation method of the first component comprises: Mixing 30 g of polyether triol and 100 g of polyether diol uniformly, heating to 100-120° C. for dehydration for 2-3 h, then cooling to 70° C., adding 1 g of methyl isocyanate, 100 g of p-phenylene diisocyanate, and 125 g of triphenylmethane isocyanate, reacting for 2-3 h under heat insulation conditions, and defoaming and cooling to obtain the first component with a —NCO content of 25±1%.

Embodiment 6

This embodiment refers to the elastomer material and its preparation method of Embodiment 1, except that the first component comprises isocyanate prepolymer obtained through reaction of polyether polyol with methyl isocyanate, p-phenylene diisocyanate and triphenylmethane isocyanate, and the isocyanate prepolymer has a —NCO content of 25%;

The preparation method of the first component comprises: Mixing 120 g of polyether diol uniformly, heating to 100-120° C. for dehydration for 2-3 h, then cooling to 70° C., adding 1 g of methyl isocyanate, 100 g of p-phenylene diisocyanate, and 125 g of triphenylmethane isocyanate, reacting for 2-3 h under heat insulation conditions, and defoaming and cooling to obtain the first component with a —NCO content of 25±1%.

Embodiment 7

This embodiment refers to the elastomer material and its preparation method of Embodiment 1, except that the second component comprises the following components in parts by weight: 30 parts of polyether triamine, 30 parts of polyether diamine, 6 parts of diethyl methane diamine, 10 parts of hydroxyl-terminated polybutadiene, and 10 parts of surface-pretreated nano titanium dioxide.

Embodiment 8

This embodiment refers to the elastomer material and its preparation method of Embodiment 1, except that the second component comprises the following components in parts by weight: 60 parts of polyether diamine, 6 parts of diethyl methane diamine, 10 parts of hydroxyl-terminated polybutadiene, and 10 parts of surface-pretreated nano titanium dioxide.

Embodiment 9

This embodiment refers to the elastomer material and its preparation method of Embodiment 1, except that the second component comprises the following components in parts by weight: 12 parts of polyether triamine, 38 parts of polyether diamine, 2 parts of diethyl methane diamine, 5 parts of hydroxyl-terminated polybutadiene, and 1 part of surface-pretreated nano titanium dioxide.

Embodiment 10

This embodiment refers to the elastomer material and its preparation method of Embodiment 1, except that the second component comprises the following components in parts by weight: 20 parts of polyether triamine, 50 parts of polyether diamine, 10 parts of diethyl methane diamine, 15 parts of hydroxyl-terminated polybutadiene, and 15 parts of surface-pretreated nano titanium dioxide.

Embodiment 11

This embodiment refers to the elastomer material and its preparation method of Embodiment 1, except that the hydroxyl-terminated polybutadiene in this embodiment is manufactured by Nippon Soda Co., Ltd., and its model is NISSO-PB, GI-1000.

Embodiment 12

This embodiment refers to the elastomer material and its preparation method of Embodiment 1, except that surface-pretreated nano aluminum oxide is used to replace surface-pretreated nano titanium dioxide;

The method of surface pretreatment comprises: adding the coupling agent KH570 to the ethanol solvent, dropwise adding the aqueous acid solution until the pH is 3-4, hydrolyzing at room temperature for 1 h, adding aluminum oxide particles with a particle size of 50 nm (the mass of KH570 is 3% of that of the aluminum oxide particles), heating to 70° C. in water bath for reaction for 10 h, filtering, washing, and drying to obtain surface-pretreated nano aluminum oxide.

Embodiment 13

This embodiment refers to the elastomer material and its preparation method of Embodiment 1, except that surface-pretreated nano silica is used to replace surface-pretreated nano titanium dioxide;

The method of surface pretreatment comprises: adding silica with a particle size of 50 nm to toluene until full dispersion, adding the coupling agent KH-550 slowly (the mass of KH550 is 4% of that of the silica particles), carrying out heating and reflux for 2 h, filtering, washing and drying to obtain surface-pretreated nano silica.

Comparative Example 1

The comparative example refers to the preparation method of Embodiment 1, except that the —NCO content of the first component—isocyanate prepolymer is 18%;

The preparation method of the first component comprises: mixing 30 g of polyether triol and 100 g of polyether diol uniformly, heating to 100-120° C. for dehydration for 2-3 h, then cooling to 70° C., adding 0.6 g of methyl isocyanate, 83 g of p-phenylene diisocyanate, and 22 g of triphenylmethane isocyanate, reacting for 2-3 h under heat insulation conditions, and defoaming and cooling to obtain the first component with a —NCO content of 18±1%.

Comparative Example 2

The comparative example refers to the preparation method of Embodiment 1, except that the second component comprises the following components in parts by weight: 15 parts of polyether triamine, 45 parts of polyether diamine, 17 parts of diethyl methane diamine, and 10 parts of surface-pretreated nano titanium dioxide.

Comparative Example 3

The comparative example refers to the preparation method of Embodiment 1, except that the second component is not added with surface-pretreated nano titanium dioxide.

Comparative Example 4

The comparative example refers to the preparation method of Embodiment 1, except that the second component is not added with hydroxyl-terminated polybutadiene.

Experimental Example 1

In order to compare and explain the properties of the elastomer materials obtained in the embodiments and comparative examples of the invention, the following property tests were conducted for elastomer materials obtained in the embodiments and comparative examples, and the test results are shown in Table 1.

TABLE 1

Property test results of different elastomer materials

| | Test items | |
| --- | --- | --- |
| Test method | Volume resistance (ohm · cm) ASTM D257 | TABER wear (mg/1000 times/1000 g) ASTM D4060 |
| Embodiment 1 | $2.8 \times 10^{14}$ | 20 |
| Embodiment 2 | $2.9 \times 10^{14}$ | 22 |
| Embodiment 3 | $2.9 \times 10^{14}$ | 20 |
| Embodiment 4 | $2.8 \times 10^{14}$ | 25 |
| Embodiment 5 | $2.8 \times 10^{14}$ | 23 |
| Embodiment 6 | $2.7 \times 10^{14}$ | 25 |
| Embodiment 7 | $2.9 \times 10^{14}$ | 26 |
| Embodiment 8 | $2.8 \times 10^{14}$ | 25 |
| Embodiment 9 | $2.7 \times 10^{14}$ | 26 |
| Embodiment 10 | $2.8 \times 10^{14}$ | 24 |
| Embodiment 11 | $2.8 \times 10^{14}$ | 22 |
| Embodiment 12 | $2.8 \times 10^{14}$ | 19 |
| Embodiment 13 | $2.8 \times 10^{14}$ | 18 |
| Comparative example 1 | $2.8 \times 10^{14}$ | 36 |
| Comparative example 2 | $2.6 \times 10^{14}$ | 33 |
| Comparative example 3 | $9.4 \times 10^{13}$ | 42 |
| Comparative example 4 | $2.9 \times 10^{14}$ | 35 |

As can be seen from the above table, the invention adds and grafts a hybrid hard segment material into the elastomer material through coupling and other reactions, thus greatly improving the electrical insulation and wear resistance of the material while taking into account its mechanical properties.

Finally, it should be noted that the above embodiments are intended to illustrate the technical solutions of the invention and not to limit them; although the invention has been described in detail with reference to the said embodiments, those skilled in the art should understand that the technical solutions described in the said embodiments may be modified, or some or all of the technical features thereof may be equivalently substituted; however, such modifications or substitutions will not essentially make the corresponding technical solutions depart from the scope of technical solutions of the embodiments of the invention.

The invention claimed is:

1. An elastomer material modified by a hybrid hard segment material, comprising;
a first component, wherein the first component comprises an isocyanate prepolymer obtained through a reaction of a polyol and a isocyanate, and the isocyanate prepolymer has a —NCO content of 22-30%; a second component, wherein the second component comprises: 50-70 parts by weight of a polyether amine, 2-10 parts by weight of a liquid amine chain extender, 5-15 parts by weight of a hydroxyl-terminated polybutadiene, and 1-15 parts by weight of a hybrid hard segment material; the hybrid hard segment material comprises one or more of a nano titanium dioxide, a nano aluminum oxide and a nano silica.

2. The elastomer material modified by the hybrid hard segment material according to claim 1, wherein a functionality ratio between the first component and the second component is 1: (1-1.05).

3. The elastomer material modified by the hybrid hard segment material according to claim 1, wherein the one or more of the nano titanium dioxide, the nano aluminum oxide and the nano silica is pretreated by a surface grafting of a coupling agent; and the coupling agent is a silane coupling agent.

4. The elastomer material modified by the hybrid hard segment material according to claim 1, wherein a particle size of the hybrid hard segment material is 50-80 nm.

5. The elastomer material according modified by the hybrid hard segment material according to claim 1, wherein the hydroxyl-terminated polybutadiene has a number average molecular weight of 1,000-2,000.

6. The elastomer material modified by the hybrid hard segment material according to claim 5, wherein the hydroxyl-terminated polybutadiene has an iodine value of less than or equal to 40 Ig/100 g.

7. The elastomer material modified by the hybrid hard segment material according to claim 5, wherein the hydroxyl-terminated polybutadiene has a hydroxyl value of 50-80 KOHmg/g.

8. A preparation method of the elastomer material modified by the hybrid hard segment material according to claim 1, comprising the following steps:
heating the polyol and dehydrating the polyol to obtain a dehydrated polyol, reacting the dehydrated polyol with the isocyanate at 50-90° C. for 2-3 h to obtain the isocyanate prepolymer, and defoaming the isocyanate prepolymer to obtain the first component;
mixing the hydroxyl-terminated polybutadiene and the hybrid hard segment material uniformly to obtain a first mixture, adding the polyether amine and the liquid amine chain extender to the first mixture to obtain a second mixture, mixing the second mixture and heating the second mixture to 50-90° C., and stirring the second mixture for 20-50 min to obtain the second component.

9. The preparation method of the elastomer material modified by the hybrid hard segment material according to claim 8, wherein the hydroxyl-terminated polybutadiene and the hybrid hard segment material are mixed and stirred uniformly at a rotational speed of 600-800 rpm and a stirring time of 10-20 min.

10. The preparation method of the elastomer material modified by the hybrid hard segment material according to claim 8, wherein at a temperature of 55-70° C. and a pressure of 30-40 MPa, the first component and the second component are mixed with a supergravity mixing method, and sprayed to obtain the elastomer material modified by the hybrid hard segment material.

11. The preparation method of the elastomer material modified by the hybrid hard segment material according to claim 8, wherein a functionality ratio between the first component and the second component is 1: (1-1.05).

12. The preparation method of the elastomer material modified by the hybrid hard segment material according to claim 8, wherein the one or more of the nano titanium dioxide, the nano aluminum oxide and the nano silica is pretreated by a surface grafting of a coupling agent; and the coupling agent is a silane coupling agent.

13. The preparation method of the elastomer material modified by the hybrid hard segment material according to claim 8, wherein a particle size of the hybrid hard segment material is 50-80 nm.

14. The preparation method of the elastomer material modified by the hybrid hard segment material according to claim 8, wherein the hydroxyl-terminated polybutadiene has a number average molecular weight of 1,000-2,000.

15. The preparation method of the elastomer material modified by the hybrid hard segment material according to claim 8, wherein the hydroxyl-terminated polybutadiene has an iodine value of less than or equal to 40 Ig/100 g.

16. The preparation method of the elastomer material modified by the hybrid hard segment material according to claim 8, wherein the hydroxyl-terminated polybutadiene has a hydroxyl value of 50-80 KOHmg/g.

\* \* \* \* \*